E. NORTON.
Seed-Dropper.

No. 211,106. Patented Jan. 7, 1879.

Witness
Jno. R. Mason
Wm. C. Mason.

Inventor
Elijah Norton
by Wm Saunders Seavy
his Atty

UNITED STATES PATENT OFFICE.

ELIJAH NORTON, OF DOVER, MAINE.

IMPROVEMENT IN SEED-DROPPERS.

Specification forming part of Letters Patent No. 211,106, dated January 7, 1879; application filed August 17, 1878.

*To all whom it may concern:*

Be it known that I, ELIJAH NORTON, of Dover, in the county of Piscataquis and State of Maine, have invented certain new and useful Improvements in Seed-Droppers; and I do hereby declare that the following is a full, clear, and exact description thereof, that will enable others skilled in the art to which it appertains to make and use the same, reference being had to the accompanying drawings, forming a part of this specification, in which—

Figure 1:
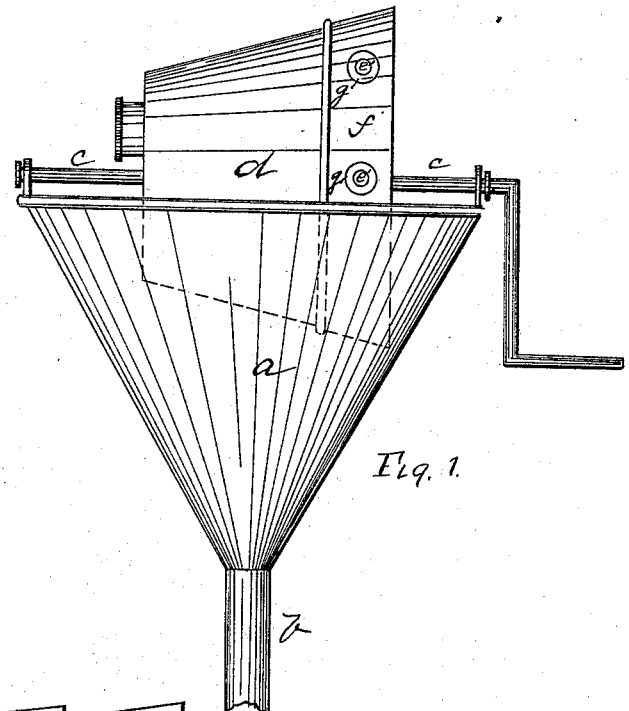
Figure 2:
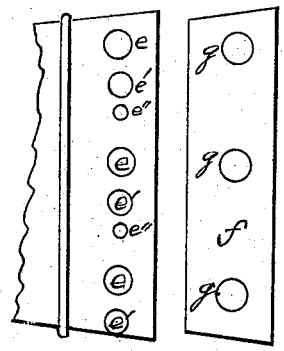

Figure 1 shows a side elevation; Fig. 2, detail of seed-box and slide.

My invention consists of an improved seed-dropper, which is also capable of use as a seed-separator.

Its construction and operation will be readily understood by reference to the accompanying drawings.

At $a$ is a conical receiver, open at the apex, to which is attached a tube, $b$. At the top of the receiver is a rod, $c$, provided with a crank at one end, and arranged to rotate, carrying with it a seed-box, $d$, in the form of the frustum of a cone, through the axis of which the rod passes. This seed-box is perforated with openings $e$ $e'$, $e''$ of different size, around its sides near its base, which openings are surrounded with an annular slide, $f$, having large openings $g$, the distances from center to center corresponding with the distances between each set of openings $e$ $e'$ $e''$.

To adjust the dropper to different sizes of seed, the slide $f$ is moved so as to bring the openings $g$ opposite the openings $e, e'$, or $e''$, as the case may require, closing the others.

It is evident that this construction enables the device to be used, if desired, as a separator, when different sizes and varieties have become mixed.

As the seed-box is revolved, the seed drops within the receiver, the conical sides of which guide it with a twisting movement into the tube, the combination of devices insuring a steady and regular feed. This twisting or spiral movement is the resultant of the rotary motion communicated to the seed by the seed-box, which, by the converging sides of the conical receiver, is resolved into a spiral motion as the seed passes down its sides to the tube.

What I claim as my invention, and desire to secure by Letters Patent, is—

In a hand seed-dropper, the combination and arrangement of the following elements, to wit: a conical receiver, $a$, terminating in a tube, $b$, and a rotating seed-box, $d$, shaped like the frustum of a cone, and revolving by a shaft over and partially within said receiver, said seed-box being provided with openings near its base, so that the seed shall be discharged at one side of the receiver, whereby the rotation in a vertical plane communicated by the drum is resolved by the circular converging sides of the receiver into a rotary or spiral motion around the axis of the tube $a$, substantially as and for the described purposes.

In testimony that I claim the foregoing I have hereunto set my hand this 10th day of August, 1878.

ELIJAH NORTON.

Witnesses:
HENRY C. PRENTISS,
D. L. SAVAGE.